United States Patent [19]

Mundy et al.

[11] 4,349,277
[45] Sep. 14, 1982

[54] NON-CONTACT MEASUREMENT OF SURFACE PROFILE

[75] Inventors: Joseph L. Mundy; Gilbert B. Porter, III, both of Schenectady; Thomas M. Cipolla, Ballston Lake, all of N.Y.

[73] Assignee: General Electric Company, Schenectady, N.Y.

[21] Appl. No.: 158,372

[22] Filed: Jun. 11, 1980

[51] Int. Cl.³ .................. G01B 11/00; G01C 3/20
[52] U.S. Cl. .................. 356/376; 250/237 G; 356/1
[58] Field of Search .............. 356/1, 4, 2, 875, 876; 250/237 G

[56] References Cited

U.S. PATENT DOCUMENTS

| | | | |
|---|---|---|---|
| 3,619,065 | 11/1971 | Agnew | 356/376 |
| 4,158,507 | 6/1979 | Himmel | 356/376 |
| 4,175,862 | 11/1979 | DiMatteo et al. | 356/375 |
| 4,180,329 | 12/1979 | Hildebrand | 356/375 |
| 4,227,813 | 10/1980 | Pirlet | 356/1 |

FOREIGN PATENT DOCUMENTS 5179831 1/1978 Japan ........................... 356/376

Primary Examiner—R. A. Rosenberger
Attorney, Agent, or Firm—Donald R. Campbell; James C. Davis, Jr.; Marvin Snyder

[57] ABSTRACT

A parallax method of wavelength labeling is based on optical triangulation. A complementary color pattern projected onto the surface is characterized by a continuous variation of the power ratio of two wavelength bands, and the profile can be measured at all points in the field of view. Shifts of the wavelength bands on separate detector arrays correspond to profile deviations. A signal processor calculates a normalized signal that is independent of surface reflectivity and roughness variations; the phase shift of this signal yields depth data from which the surface profile can be mapped.

28 Claims, 19 Drawing Figures

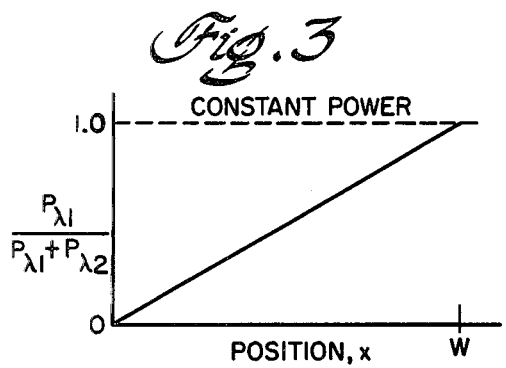
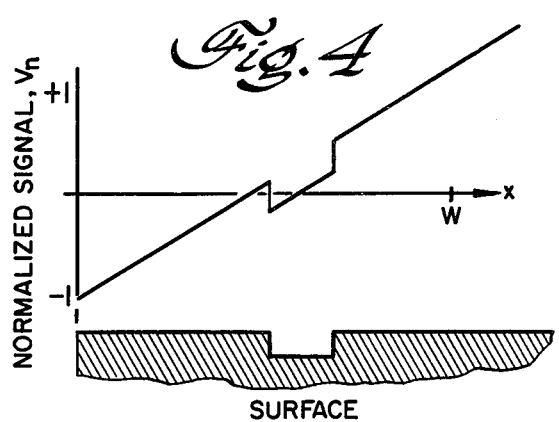
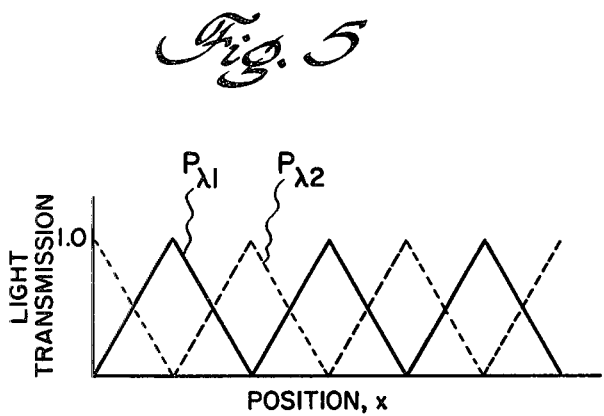
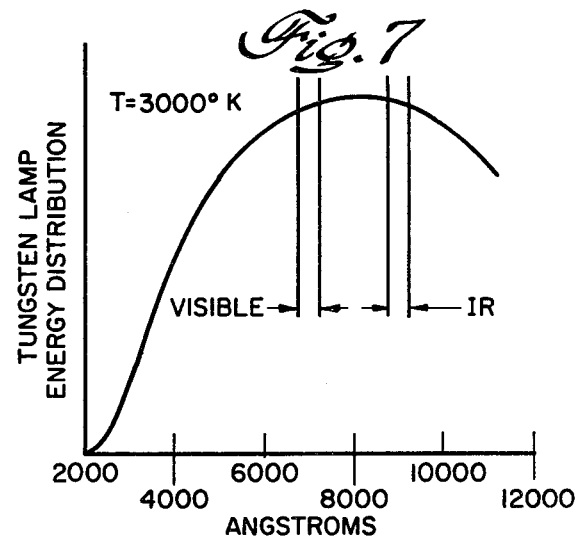
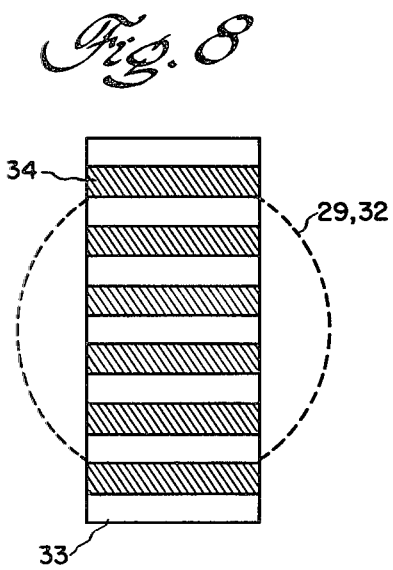
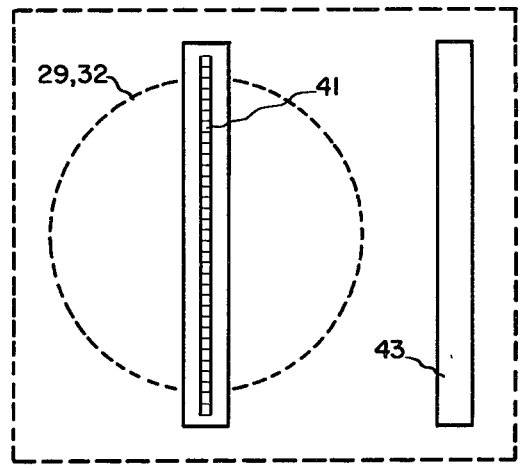

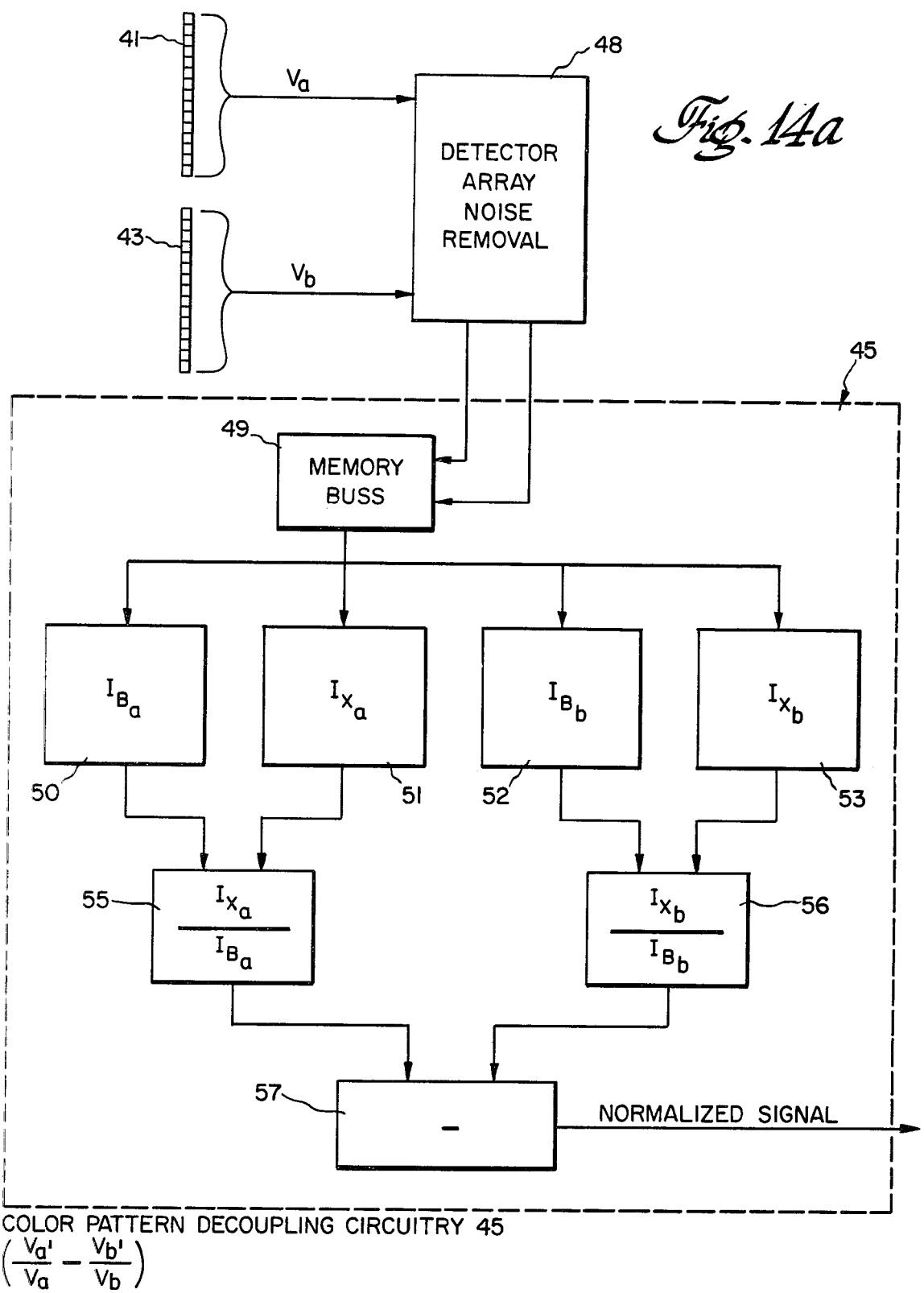

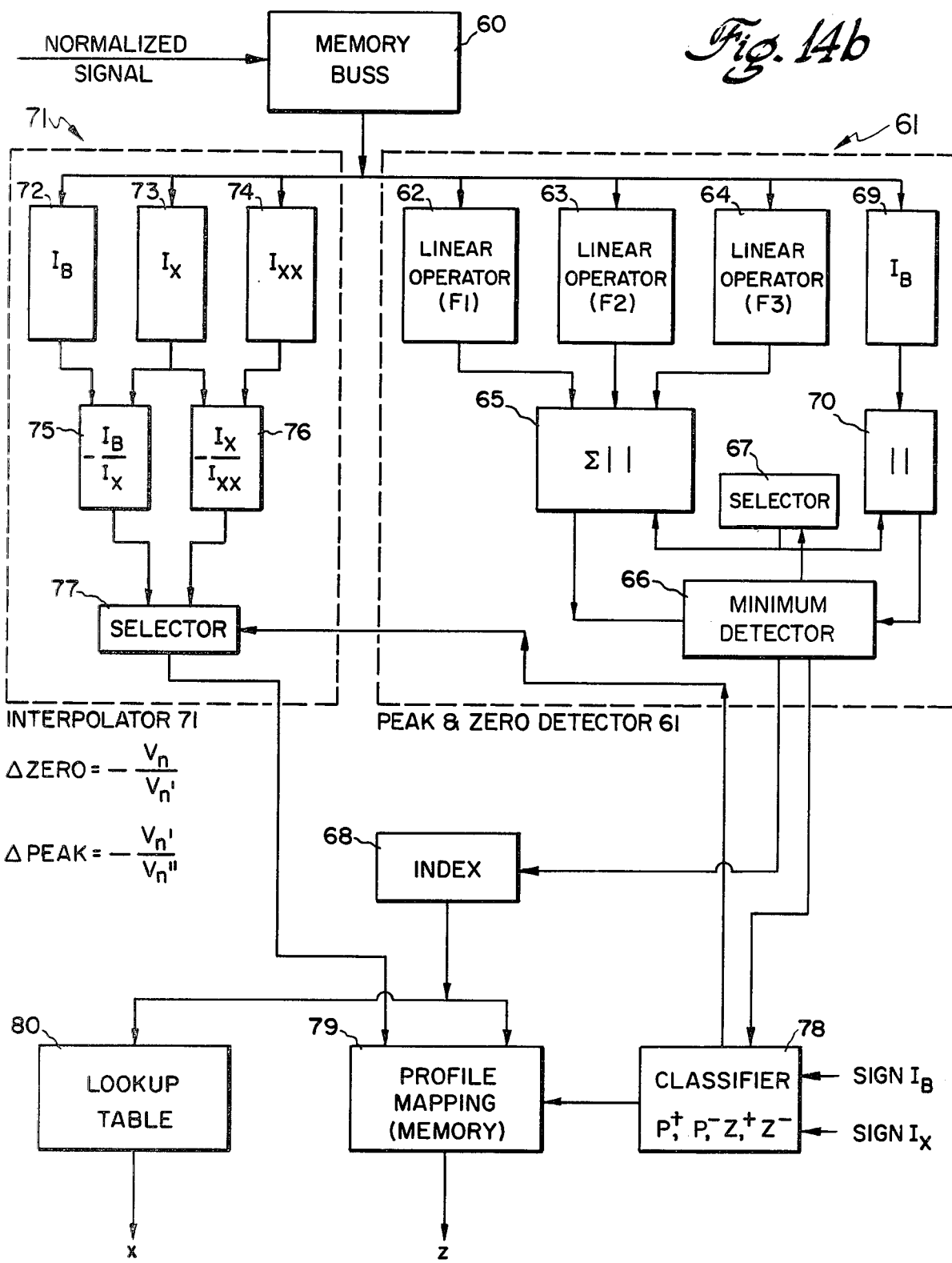

NON-CONTACT MEASUREMENT OF SURFACE PROFILE

BACKGROUND OF THE INVENTION

The Government has rights in this invention pursuant to Contract No. F33615-78-C-5095 awarded by the U.S. Air Force.

This invention relates to methods and apparatus for measuring surface profile by the use of color and with relative immunity to surface reflectivity and roughness.

It has been known for many years that optical triangulation can yield accurate knowledge of surface profile. The basic idea is shown in FIG. 1. The shift in observed position, $\delta$, of the incident pencil ray in intersection with the surface, allows the calculation of the shift in position of the surface with respect to the reference surface ($z=0$). That is, $$\delta = \Delta z M \sin \theta,$$

where M is the optical magnification, $\theta$ is the parallax angle, $\Delta z$ is the shift in surface position, and $\delta$ is the shift in observed spot position. This concept has been employed in a wide variety of metrological sensors, but has a number of drawbacks. The measurement involves only one point at a time and the maximum rate is 10,000 points/sec. Accurate scanning of the incident ray must be maintained. A higher scan rate is possible if there are several incident rays, but then there is ambiguity as to which relected ray is which on the sensor array. The result is dependent on surface reflectivity which can vary several orders of magnitude with metal surfaces.

In the application of surface topography the use of parallax photography (photogrammetry) has overcome the first of these objections. In this case each point in one of the two views of a surface is correlated with the corresponding neighborhood in the other view. The location of the correlation peak allows the calculation of the shift between the two views, which in turn leads to surface profile. This approach has the drawback that the correlation is computationally expensive and leads to some ambiguity if there is uncorrelated noise present in the images.

A final relevant approach is the so-called Moire fringe technique. A bar pattern is projected onto the surface to be measured. The surface is observed through a similar bar mask. This leads to interference fringes that indicate the variation in surface profile. The drawback is that the lateral resolution cannot exceed the spacing of the bar pattern. In addition, the variation in surface reflectivity inteferes with fringe formation.

SUMMARY OF THE INVENTION

The parallax method with wavelength labeling involves projecting onto the surface of a reflective object a color pattern having at least two wavelengths or wavelength bands of light, in the ultraviolet, visible, or infrared regions. This pattern provides a well defined spatial variation so that shifts of reflected light due to profile variations can be easily detected. The use of different wavelengths provides immunity to surface reflectivity variations in that shifts correspond to profile deviations. It is preferred to have a complementary color pattern which is formed by extracting equal energy bands from a light source. The position of each point in the projected pattern is uniquely identified by the relative amounts of each wavelength power incident on the surface. In order to have depth sensitivity the power variation should be steep; periodic sawtooth or cosine light transmissions satisfy the requirement.

The use of wavelength labeling makes the identification of shifts straight forward. Reflected light is sensed at a given parallax angle and the different wavelengths or wavelength bands are separately detected and shift position on the detector array depending upon the depth from the object surface to a reference. Separate sensor signals are generated corresponding to the detected light intensity of each wavelength band. The sensor signals are combined in the color pattern decoupling circuitry of a signal processor and a normalized signal is extracted that is substantially independent of surface reflectivity and roughness variations. The phase shift of the normalized signal with respect to a reference is determined and hence depth data from which the surface profile can be mapped.

The optical sensor given in detail has a transmitter with a multispectral lamp, dichroic mirrors for extracting visible and infrared bands, condensing lenses, and a patterned mirror with a bar pattern that combines the wavelength bands and projects a periodic complementary color pattern. The optical receiver has dichroic filters for extracting the visible and IR bands from the reflected light and separate linear photodiode detector arrays. The normalized signal is calculated by the equation $(V_a'/V_a - V_b'/V_b)$, where $V_a'$ and $V_b'$ are the first derivatives of sensor signals $V_a$ and $V_b$. A peak and zero detector and an interpolator determines the phase shift periodically, and depth data is produced corresponding to the phase shift.

BRIEF DESCRIPTION OF THE DRAWINGS

FIG. 3 shows a linear ramp relationship between $P_{\lambda 1}$/total power and position;

FIG. 4 shows the normalized linear ramp with a deviation due to a profile step;

FIG. 5 is a plot of complementary "sawtooth" light transmissions for wavelengths $\lambda_1$ and $\lambda_2$;

FIG. 7 is a graph of the energy distribution of a tungsten light source;

FIG. 8 is a plan view of the patterned mirror in FIG. 6;

FIG. 9 illustrates the two linear photodiode arrays with relation to the condensing lenses and patterned mirror;

FIGS. 14a and 14b are detailed block diagrams of the preferred embodiment of the color pattern decoupling circuitry and signal shape to profile mapping circuitry;

DESCRIPTION OF THE PREFERRED EMBODIMENTS

Figure 1:
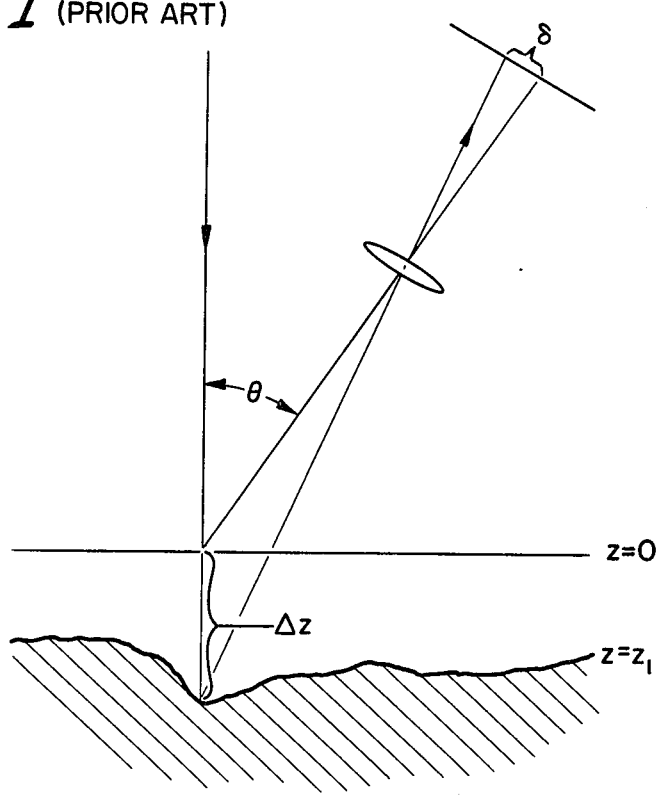
FIG. 1 is a prior art diagram of the basic concept of single point optical triangulation.
Figure 2:
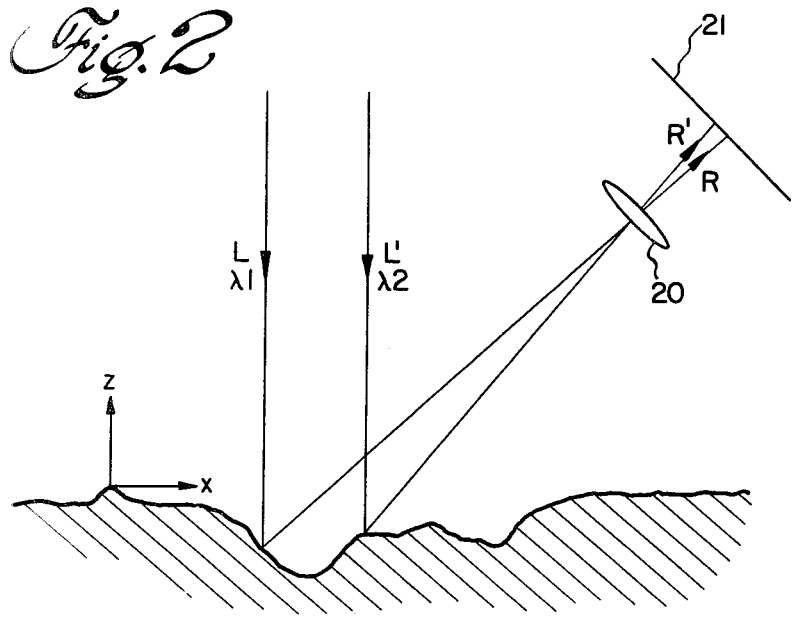
FIG. 2 depicts the principle of the parallax method with wavelength labeling.

The main difficulty in any parallax triangulating method is the location of matching points in the projected and sensed light patterns. With a single point, the problem is eliminated at the expense of speed. The wavelength labeling technique illustrated in FIG. 2 provides many points in parallel without ambiguity. Here two incident rays are provided, L and L'. The rays are made distinct by providing different colors, say blue and red, and reflected rays R and R' are focused by objective lens 20 onto a detector array 21. The spot images are now distinct if the detector consists of two arrays with color separating filters. Another benefit is readily obtained, insensitivity to reflectivity variations. Color is the parameter of interest and this can be derived from the two detector signals independent of absolute signal level. The only remaining unwanted sensitivity is to color variations of the surface being measured. This is not of great concern with many objects, such as airfoil parts, which generally provide uniform wavelength reflectance properties. In any case, the color variations are less frequent and more predictable than reflectivity variations. The concept is valid for two or more colors or for a continuous variation of wavelengths.

The next step is to consider a simple spatial variation in wavelength. Suppose that two discrete wavelengths, $\lambda_1$ and $\lambda_2$, are provided in the illumination source and that, as shown in FIG. 3, these are then combined. The sum of the two wavelength powers is assumed to be constant, and the ratio $P_{\lambda 1}$/total power or $P_{\lambda 2}$/total power is continuously variable and is linear. The position of each point in the light pattern is uniquely identified by the relative amounts of each wavelength power incident on the surface. Assuming that the detector arrays are sensitive to only one of the wavelengths, it is possible to compute a ratio of the detected light signals and get a unique color position. The ratio of the difference in their signals to the sum is related directly to the spatial variation of the above ratio. The simplest way to show this is as follows:

$$P_{\lambda 1} = kx/W$$

$$P_{\lambda 2} = k(1 - x/W)$$

$$P_{\lambda 1} + P_{\lambda 2} = k$$

$$(P_{\lambda 1} - P_{\lambda 2})/(P_{\lambda 1} + P_{\lambda 2}) = 2x/W - 1$$

where
k = a constant,
x = position, and
W = maximum width.

The latter refers to received light power and is known as the normalized signal. The normalized signal, $V_n$, is plotted in FIG. 4 and would be a straight line if the surface whose profile is being measured were flat. A step change in the surface delays the waveform by a certain amount.

Thus, the deviation and position on the sensor of a particular ratio of wavelength powers leads directly to shift in surface position. Since the illumination produces a continuous variation of power ratios, the profile can be measured at each point in the sensor. An important feature is that it can be shown by a similar mathematical treatment that the normalized signal is independent of surface reflectivity so that variations in this reflectivity and in surface roughness do not affect the resulting shift measurement. This assumes that the reflectivity is independent of wavelength. The reflectivity appears in both the difference and sum terms and cancels out when the ratio is taken.

The wavelength labeling technique using a single linear ramp variation of wavelength powers has two constraints that cannot both be satisfied. A linear variation is wanted and also a high sensitivity to profile changes, but these two are incompatible. A high sensitivity to profile changes calls for a high slope but then the maximum width, W, that can be measured at one time becomes small. The sawtooth or equilateral triangle light transmission pattern in FIG. 5 has good depth sensitivity and a larger field of view can be covered at one time. This is a periodic, complementary color pattern; at every point, x, the total transmitted power, $P_{\lambda 1} + P_{\lambda 2}$, is constant. There is a limit as to how close the periods can be, and the period cannot become too short because the problem of ambiguity arises again. In the received light pattern, the peaks shift in response to profile changes, and the peaks begin to cross if the period is too short. On the other hand, the period should not be too large because a steep slope is wanted. There is a compromise, then, as to ambiguity and depth sensitivity, and the slope steepness of the sawtooth transmitted light pattern is selected with this in mind. The sawtooth complementary color pattern can be implemented but may require well collimated light beams such as are produced by laser light sources.

Figure 6:
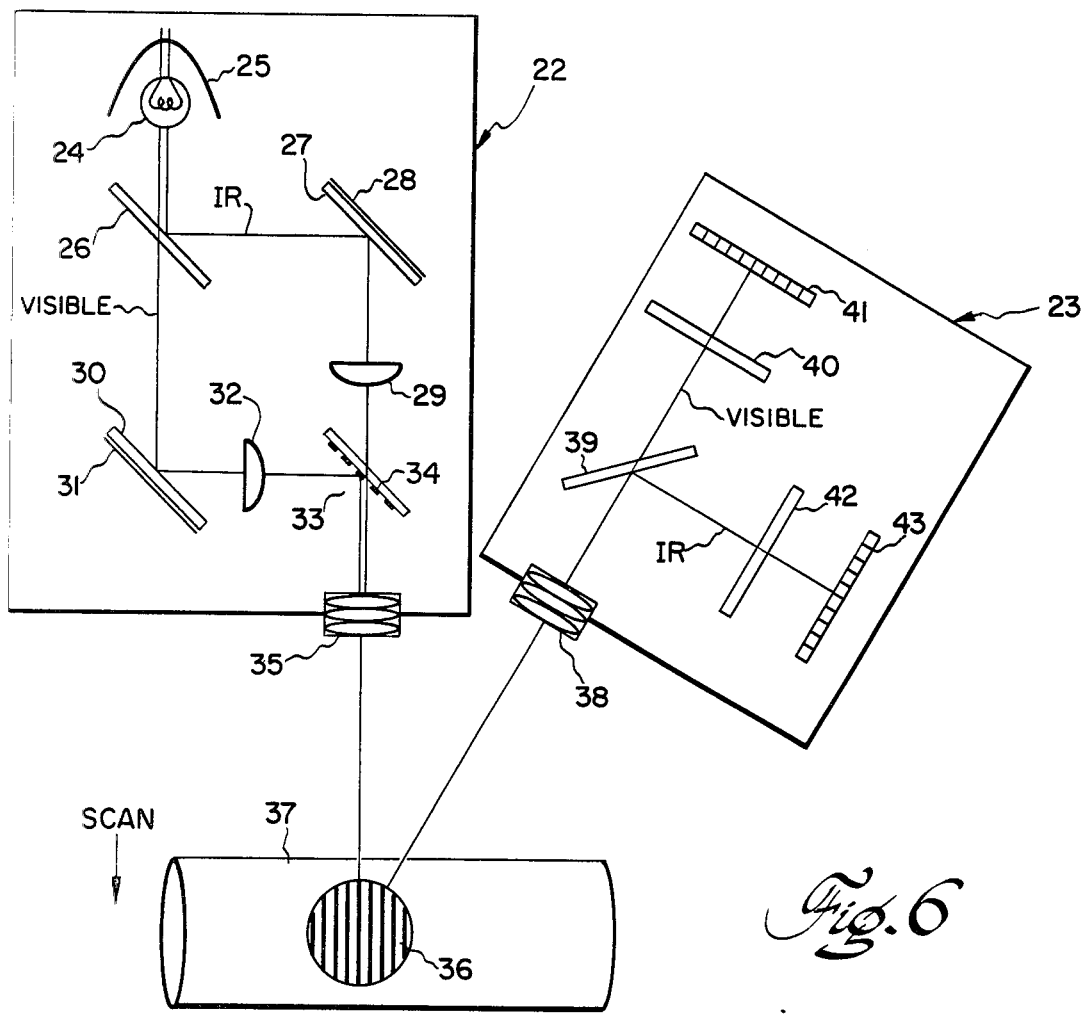
FIG. 6 is a simplified diagram of the preferred embodiment of the optical sensor for generating and projecting a complementary color pattern onto an airfoil part, and for separately detecting the received color bands.

The preferred embodiment of the optical sensor is depicted in FIG. 6. This sensor was developed to achieve a number of specific performance goals in accordance with the requirements for inspection of metal surfaces, in particular the profile measurement accuracies involved in aircraft engine airfoil parts, or turbine blades. The technique is applicable to many reflecting surfaces and the sensor represents a general solution to the problem of profile measurement. Having determined the surface profile, it is then possible to look for local deviations in the surface such as pits, fractures, dents, nicks, and discolorations. The performance goals are that it is desired to detect 0.001 inch variations in surface profile over a one inch field of view. Surface defects with lateral dimensions as small as 0.010 inch are to be detected. The reflectivity of part surfaces may vary as much as an order of magnitude due to coatings and surface finish. Sensor data rates of $10^6$ pixels/sec are to be provided. This optical sensor which implements the wavelength labeling technique meets all of these specifications.

In FIG. 6, the sensor is comprised of an optical transmitter 22 and an optical receiver 23. The parallax angle is chosen carefully and 26° is a good compromise; at this angle there is adequate sensitivity to profile changes and reduced sensitivity to local surface roughness variations. Light source 24 is an incandescent tungsten lamp, which is a multispectral source with illumination in the visible and infrared regions. The infrared portion of the illumination ($\lambda > 8000$ Å) represents about 50 percent of the available power, and to achieve maximum illumination efficiency, this energy must be used. Elliptical reflector 25 is selected to reflect all wavelengths emitted by the source. The spectral distribution of the tungsten lamp can be conveniently split into two equal wavelength bands by readily available dichroic reflectors, and it is desirable to have equal powers in both wavelength bands. Referring to FIG. 7, which shows the tungsten source distribution, there are many possible choices, one in the visible region and the other in the infrared region, satisfying the requirements that the bands can be separated by available optical filtering techniques and that the powers are equal. Another requirement is that the source and light detector should be well matched. The power distribution from the tungsten lamp is well matched to the solid state detector.

A dichroic mirror 26, FIG. 6, reflects the IR spectral components and transmits the visible components. A second dichroic mirror 27 has a light absorbing backing 28 and reflects only the extracted IR wavelength band to an aspheric condensing lens 29. The visible light is reflected by another dichroic mirror 30 having a light absorbing backing 31, and the extracted visible wavelength band passes through an aspheric condensing lens 32. A patterned mirror 33 has a bar pattern 34 on one surface which is depicted in greater detail in FIG. 8. Bars 34 have equal widths and are equally spaced from one another, and can be metallized stripes. The IR band is transmitted through the spaces between the bars, FIG. 6, and the visible band is reflected by the bars. The IR and visible bands alternate and the light is registered and projected in the same direction. Objective lens 35 focuses the complementary color pattern 36 onto the surface of airfoil part 37.

Figure 10:
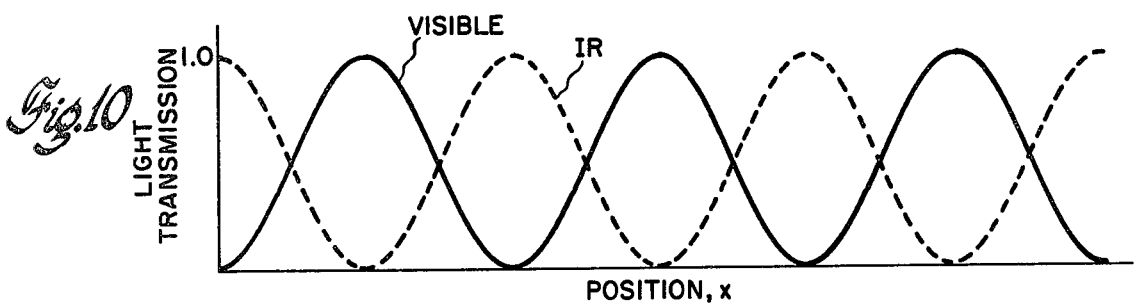
FIG. 10 is a waveform diagram of complementary "cosinusoidal" visible and IR light transmissions.

The transmitted complementary color pattern is shown in FIG. 10, where it is observed that the waveforms of the visible and IR bands are "cosinusoidal", have a constant amplitude, and are 180° out of phase. It might be expected that bar pattern 34 would produce a square wave projected light pattern with alternating visible and IR stripes, but the cosine wave distribution of the two bands is actually produced because of the spreading out effect of aspheric lenses 29 and 32. The projector optics produces a circular illumination pattern but the usable part of the pattern is a central rectangle 1 inch long by 0.125 inch wide. Each wavelength power in the projected color pattern, FIG. 10, continuously varies and the total wavelength power is approximately constant at every point. As was the case with sawtooth illumination, the position of each point in the projected pattern is uniquely identified by the relative amounts of each wavelength power incident on the surface. The complementary color pattern does more than supply illumination because additionally a signal is transmitted by the projection optics.

Optical receiver 23 has an objective lens 38 and an IR reflecting dichroic mirror 39 which transmits the visible wavelength bands of the reflected light pattern. These bands are passed by a visible pass filter 40 and are sensed by a linear photodiode array 41 whose individual elements generate sensor signals corresponding to the detected light intensity. The IR wavelength bands are reflected to an IR pass filter 42 and are sensed by a second linear photodiode array 43 which is orthogonal to and aligned with the first array 41. FIG. 9 shows the separate detector arrays 41 and 43 and (see FIG. 8) their relation to patterned mirror 33 and condensing lens 29 and 32. The detector arrays both have 512 diodes to realize the required field of view, and are commercially available components such as the linear diode array scanner of Reticon Corp., which is electrically scanned at a 1 MHz clock rate. The array elements are sampled sequentially in the nature of a raster scan and the individual photodiodes generate an analog signal proportional to the light falling on that element. Separate visible and IR sensor video signals are generated.

Figure 11:
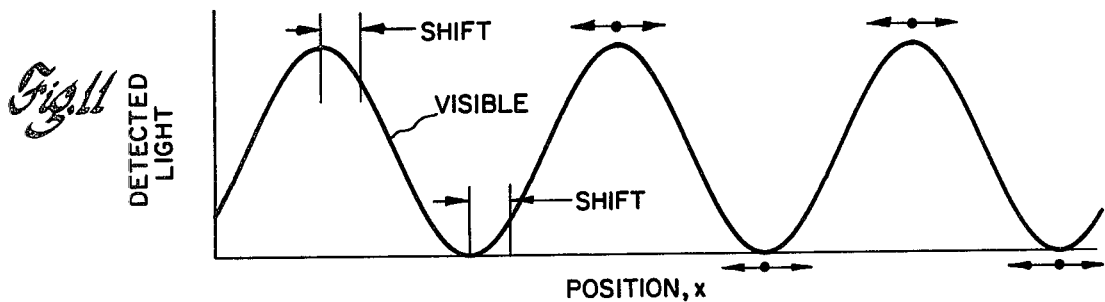
FIGS. 11 and 12 show the shifted visible and IR received light waveforms.
Figure 12:
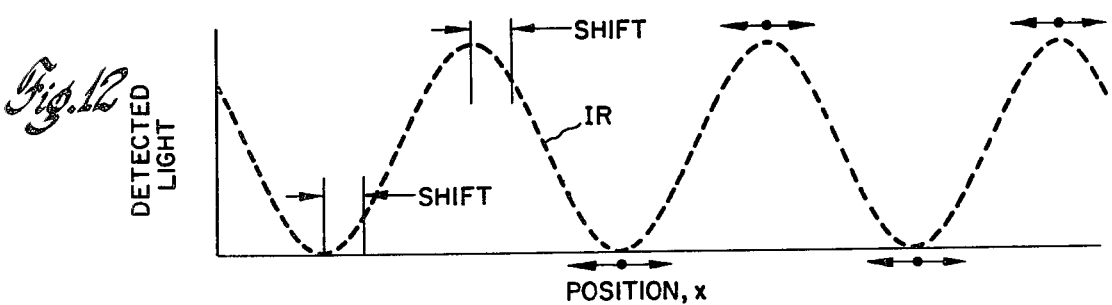

As the scan is performed, airfoil part 37 and optical sensor 22, 23 move relative to one another to scan all of the part surfaces. One end of the part is clamped mechanically and then the other end so that profile data is taken all over the part. The color illumination pattern is incident approximately normal to the surface at all times, and optical transmitter and receiver 22 and 23 are fixed relative to one another and the parallax angle is unchanged. Changes in depth of the surface cause a corresponding change in phase between the transmitted and received light patterns. In the optical receiver, the visible and IR wavelength bands shift position on detector arrays 41 and 43 depending upon the depth from the part surface to a reference surface, which reference surface is in the optical sensor. FIGS. 11 and 12 illustrate shifts in the peaks of the visible and IR detected light or received power waveforms due to profile variations. The shift is the same in both waveforms at any given position. The double ended arrows indicate that the shifts of the peaks at other x positions depends upon the profile variation at those points.

Before proceeding further, alternative approaches for realizing the complementary color pattern will be mentioned. Laser and arc light sources are also suitable. Lasers produce nearly single wavelength illumination and two different lasers are required. The argon ion and neodymium yag types have the required power level, but require arc tube excitation and attendant complex power supplies. The problem of speckle can be overcome, but the sources are too cumbersome physically to be mounted directly in the sensor head assembly. The most readily available arc source for the present application is the indiumargon system. This lamp has a suitable wavelength distribution and more than adequate illumination power, but has an unsatisfactory life and needs to be cooled. Instead of patterned mirror 33, film spatial patterns may be used. Two such patterns are prepared and the transmissions of the film patterns are complementary. An output beam splitter recombines the wavelength bands, and a disadvantage is the requirement to align the two film patterns and the beam splitter. Another disadvantage is the film itself; the proper amplitude variation depends on film exposure and development conditions and these are difficult to control.

Mirror patterns are prepared by vacuum depositing an aluminum film on a glass substrate and then selectively etching the film using photolitographic techniques. If a discrete line pattern is on a scale smaller than the resolution of the source-receiver optics, the function will be related to the spatial average of line spacing and width. This can be easily varied in a continuous fashion to realize a sawtooth transmission pattern. A diamond pattern mirror is based on the use of cylindrical lens elements. The basic idea is to transmit and reflect well-collimated beams from the mirror pattern. The emerging spectral mixture is brought to focus at the part surface by a cylindrical lens. The diamond pattern provides a linear sawtooth variation when all rays in a line orthogonal to the cylinder axis are brought together. The scheme requires that the rays incident on the mirror pattern be well collimated, and this suggests that the diamond pattern is most applicable to the laser source.

Figure 13:
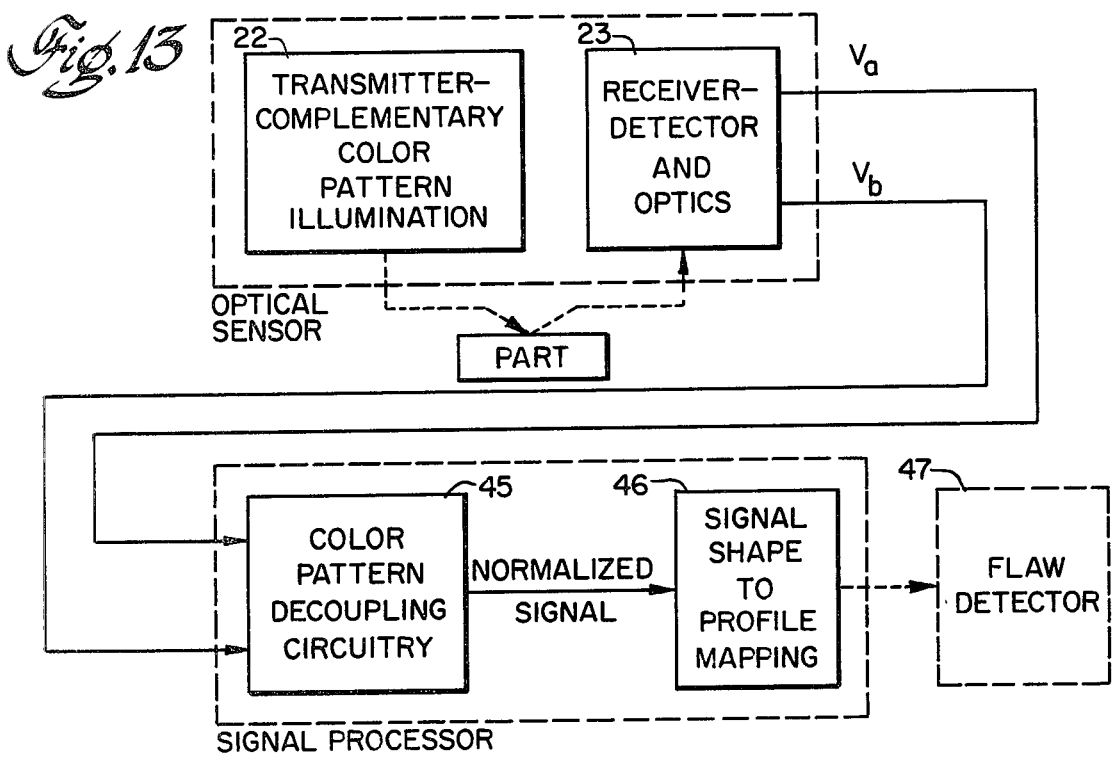
FIG. 13 is a system block diagram of the non-contact profile sensor (the flaw detector is not part of this invention)

FIG. 13 is a simplified block diagram of the non-contact profile sensor. Visible and IR band sensor signals $V_a$ and $V_b$ are fed to a signal processor which generates depth or profile data in real time and at a rate of $10^6$ points/sec. Color pattern decoupling circuitry 45 combines the pair of sensor signals $V_a$ and $V_b$, decouples color pattern data from surface function data, and extracts a single normalized signal that is substantially independent of surface reflectivity and roughness variations. The normalized signal is fed to signal shape to profile mapping circuitry 46; the phase shift of the peaks and zeroes of the normalized signal with respect to a reference is determined, and the phase shift information is converted to depth or profile data from which the surface profile can be mapped. Flaw detector 47, which is not a part of this invention, recognizes and identifies local deviations in the surface profile, such as pits, fractures, dents, etc., which are a basis for rejection of the part.

The theory underlying color pattern decoupling is set forth before discussing the preferred hardware implementation in FIG. 14a.

$$V_a = A\alpha$$

$$V_b = B\beta$$

where A and B are models of the light scattering from the surface, and $\alpha$ and $\beta$ are models of the labeling scheme. These terms can be expressed locally as polynomials:

$$A = A_0 + A_1 x$$

$$\alpha = \alpha_0 + \alpha_1 x + \alpha_2 x^2$$

$$B = B_0 + B_1 x$$

$$\beta = \beta_0 + \beta_1 x + \beta_2 x^2$$

Multiplying polynomials, $$V_a = A_0\alpha_0 + (A_1\alpha_0 + A_0\alpha_1)x + (A_1\alpha_1 + A_0\alpha_2)x^2 + (A_1\alpha_2)x^3$$

$$V_b = B_0\beta_0 + (B_1\beta_0 + B_0\beta_1)x + (B_1\beta_1 + B_0\beta_2)x^2 + (B_1\beta_2)x^3$$

The foregoing are Taylor series and it can be shown that:

$$\frac{V_a'}{V_a} = \frac{A_1\alpha_0 + A_0\alpha_1}{A_0\alpha_0} = \frac{A_1}{A_0} + \frac{\alpha_1}{\alpha_0}$$

$$\frac{V_b'}{V_b} = \frac{B_1\beta_0 + B_0\beta_1}{B_0\beta_0} = \frac{B_1}{B_0} + \frac{\beta_1}{\beta_0}$$

where $V_a'$ and $V_b'$ are first derivatives about the relative point $x=0$. Then, $$\frac{V_a'}{V_a} - \frac{V_b'}{V_b} = \left(\frac{A_1}{A_0} - \frac{B_1}{B_0}\right) + \left(\frac{\alpha_1}{\alpha_0} - \frac{\beta_1}{\beta_0}\right)$$

The first bracketed term goes to zero because the surface is the same and the surface functions are identical. The extracted color labeling data remains:

$$V_a'/V_a - V_b'/V_b = \alpha_1/\alpha_0 - \beta_1/\beta_0$$

This technique is more general than that given previously, calculating the ratio of the difference of the sensor signals to the sum of these signals, because the latter assumes equal wavelength band powers. The above is good for equal or unequal wavelength band powers.

Figure 15:
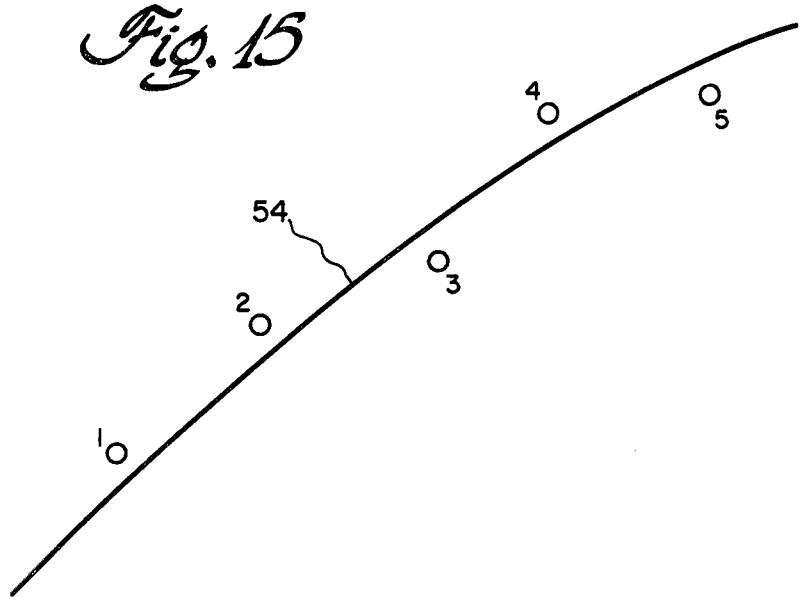
FIG. 15 is a diagram for explaining the color pattern decoupling circuitry.

Referring to FIG. 14a, visible and IR band detector video signals $V_a$ and $V_b$, in digital form, are fed to a detector array noise removal circuit 48 and hence to a memory bus 49. Both detector arrays 41 and 43 are scanned electrically at a high rate and the serialized data on both lines is continuously fed to color pattern decoupling circuitry 45. The data for five points or pixels is read out in parallel to four operators 50–53. All four operator circuits are identical and are implemented with a large scale integrated multiplier-accumulator chip (such as TRW Type TDC1009J) and a memory to store a set of coefficients for each of the five points. Any given section of the cosine wave is approximated by a second order polynomial. The operators calculate the polynomial which is least squares fitted to a number of points above a given pixel. Points 1–5 in FIG. 15 are typical of the data that is sensed. The problem to determine the cosine wave 54 that is the best least squares fit, i.e., the sum of the squares of the differences between the curve and each data point is a minimum. In each operator 50–53, the stored coefficients are sequentially multiplied by the sensed pixel data and the sum for all five points is calculated. With reference to the normalization equation ($V_a'/V_a - V_b'/V_b$), operators $I_{Xa}$ and $I_{Xb}$ calculate the derivatives of the polynomial at any given point, and operators $I_{Ba}$ and $I_{Bb}$ calculate the values of the polynomial at any given point. Circuits 55 and 56 perform the indicated divisions and subtractor circuit 57 generates the normalized signal $V_n$. These operators are applied at each pixel position sucessively in a serial raster scan fashion. The resulting values of $I_{Ba}$, $I_{Bb}$, $I_{Xa}$, and $I_{Xb}$ are the desired function (value and derivative) of the least squares polynomial fit (of preselected order) about the pixel of evaluation.

Figure 16:
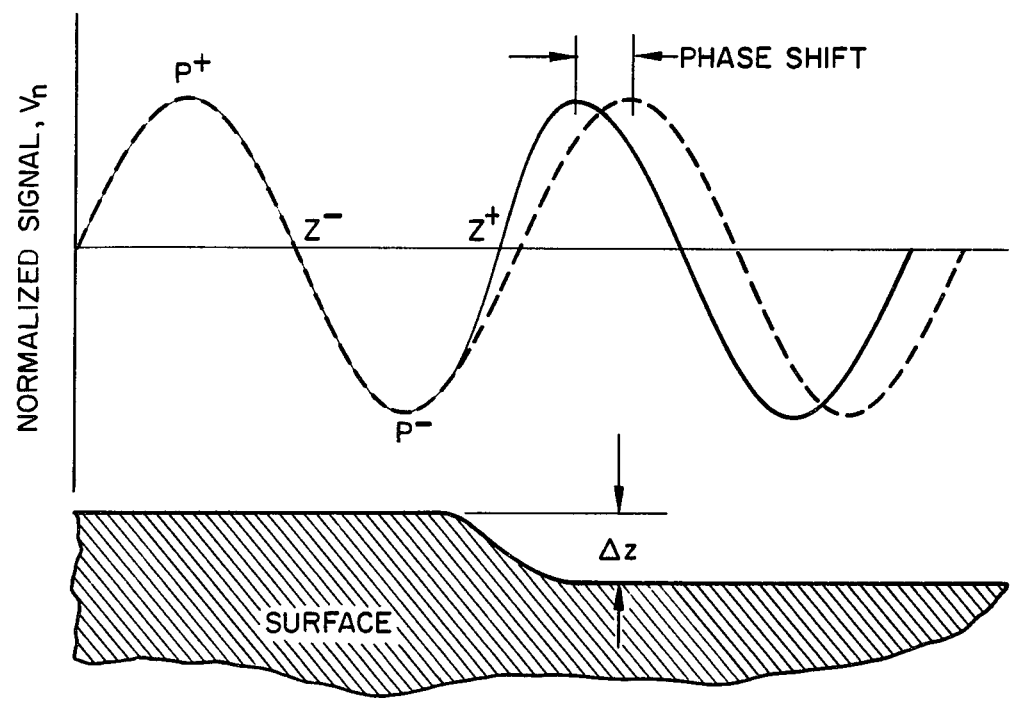
FIG. 16 is a waveform diagram of the normalized signal illustrating the phase shift from the expected signal due to a change in surface profile.

Assuming that the surface being measured is flat, the expected normalized signal shown in dashed lines in FIG. 16 is a periodic cosine wave and the periods are equal to one another. A change in the profile, $\Delta z$, leads to a phase shift of the detected cosine wave which is shown in full lines. The phase shift at the peak of the cosine wave, and also at the zero, is proportional to the depth or profile change, $\Delta z$. The symbols $P+$ and $P-$, standing for positive and negative peaks of the wave, and $Z+$ and $Z-$, standing for positive slope and negative slope zeros of the cosine wave, are indicated in FIG. 16. The normalized signal, it is re-emphasized, is independent of surface reflectivity and roughness variations.

Figure 17:
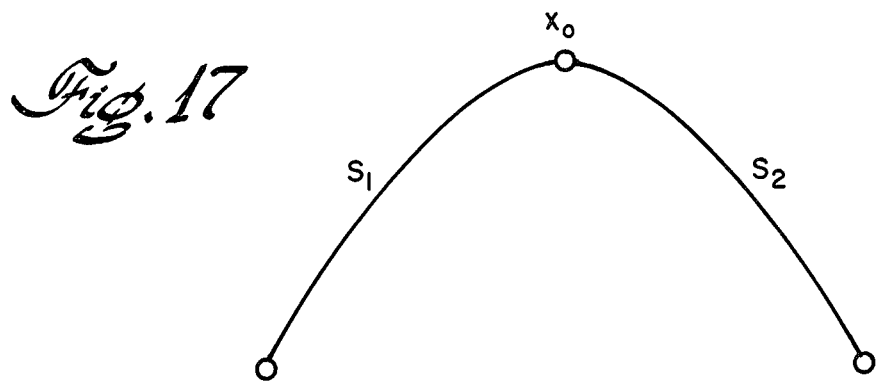
FIG. 17 is a diagram for explaining the peak detector circuit.

The mathematical basis for peak detection will be explained with reference to FIG. 17. Two oppositely sloped curve sides $S_1$ and $S_2$ meet at peak point $x_o$. The following three functions tend to go to zero at the peak and their sum is a minimum at the peak, $F_{peak} \rightarrow 0$.

$$F1: \frac{\partial}{\partial x}(P(x_O)) \longrightarrow 0$$

At the peak the top is flat and the partial derivative of the polymonial P approximately at $x_o$ goes to zero.

$$F2: P(S_1(x_0)) - P(S_2(x_0)) \longrightarrow 0$$

The polymonial approximation of both sides $S_1$ and $S_2$ predicts the same point.

$$F3: \text{Slope }(P(S_1)) + \text{Slope }(P(S_2)) \longrightarrow 0$$

The slope of both sides are approximately equal and opposite. The peak is located when the sum of the absolute value of these three functions, taken at many points $x_o$, is minimum.

Turning to FIG. 14b, the normalized signal, although smoothed by the pattern decoupling process, still has localized fluctations and irregularities and may even in some cases contain false zeros and peaks. The normalized signal is fed to a memory buss 60, and sets of nine data points are read out in sequence and presented to a peak and zero detector 61. Linear operators 62–64 are identical to circuits 50–54; they respectively calculate the functions F1, F2, and F3, and their absolute sum is calculated in circuit 65 and passed to the minimum detector 66 by selector 67 which determines whether a peak or zero is being detected. This determination is made by comparing the output of the peak detector components 62–65 and zero detector components 69 and 70 and selecting the signal with the smaller amplitude. This signal is then tracked until it achieves a minimum value at which point the peak or zero is said to exist. When a positive or negative peak in the normalized signal is recognized, the index number of the photodiode array element (1–512) is read out of memory 68.

A set of five data points is also presented to operator 69, which is identical to operators 50 and 52. This operator, $I_B$, determines the cosine wave that is the best least squares fit. Absolute value circuit 70 is essentially a rectifier and sends an output to minimum detector 66 when a zero in the normalized signal is identified. The index numbers corresponding to the signal zeros are read out of memory 68. Interpolator 71 is in parallel with peak and zero detector 61, which determines the gross location of the peaks and zeros. This interpolator subdivides the phase shift pixel interval into 32 parts and gets the peaks or zeros between pixels. The added increment ΔZero is calculated by dividing the normalized signal, $V_n$, by the first derivative, $V_n'$; the added increment ΔPeak is calculated by dividing $V_n'$ by $V_n''$, the second derivative. The set of nine data points is fed in parallel to circuits 72–74, which are identical to operator 69. Operator $I_B$ yields the best least squares fit cosine wave at a given point, operator $I_X$ yields the first derivative of the polynomial at the given point, and operator $I_{XX}$ calculates the second derivative at that point. The indicated divisions are performed by blocks 75 and 76, and the ΔZero or ΔPeak increment is gated by a selector 77.

Figure 18:
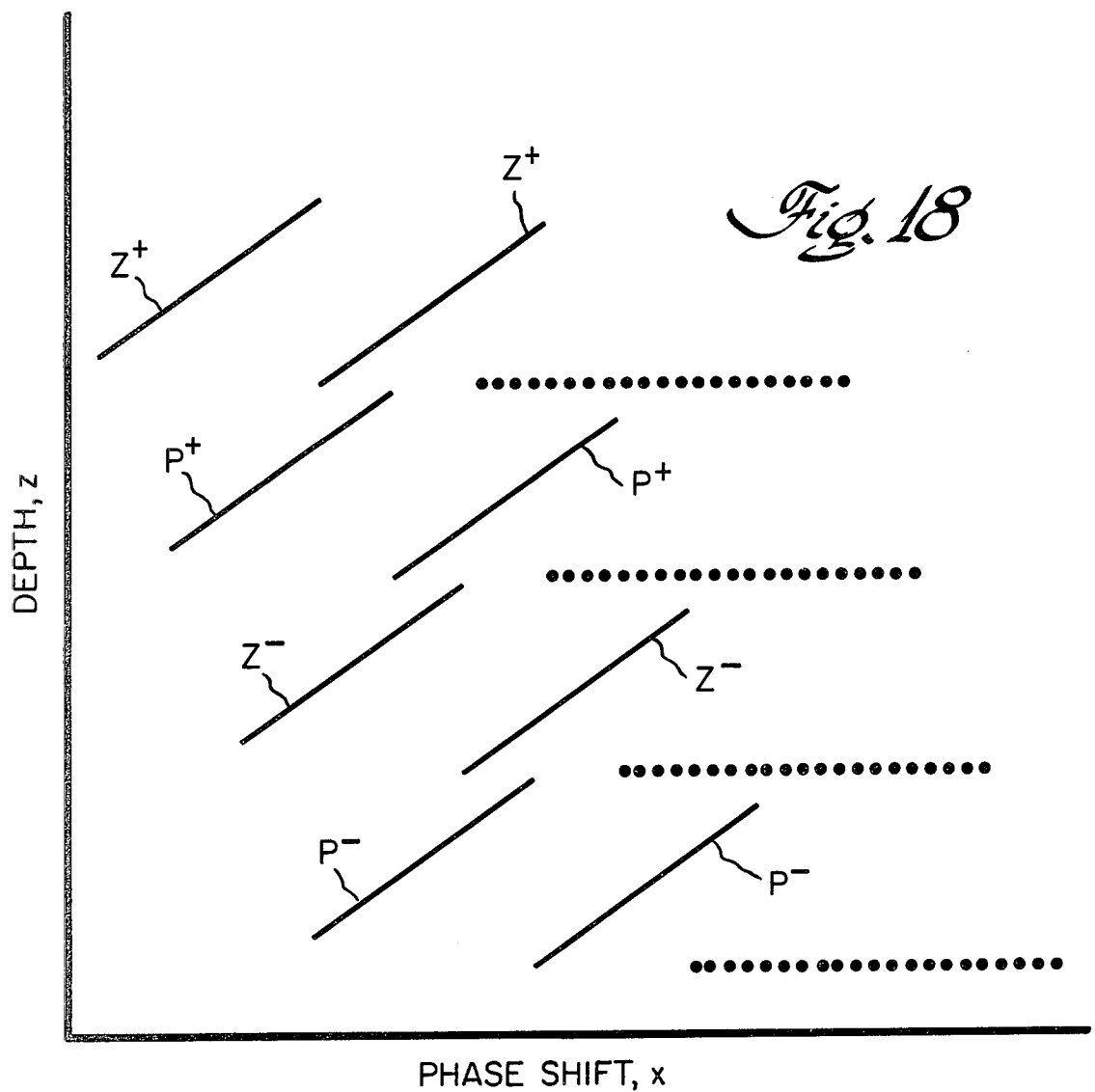
FIG. 18 is used in profile mapping to determine z, the depth or profile data, given x, the phase shift data.

A classifier 78 identifies the four cosine wave classes or features P+, P−, Z+, and Z− (see FIG. 16) and the one that is selected depends on the sign of $I_B$ and $I_X$. The class information is fed to selector 77 and either the interpolated zero or interpolated peak data is passed to a profile mapping subsystem 79. Profile mapping circuitry 79 has a set of memories such that, given the class, a particular memory is accessed and the depth or profile data, z, corresponding to the phase shift can be read out. The need for four memories, one for each of the classes, Z+, P+, Z−, and P−, can be seen in FIG. 18 where it is shown that the four classes overlap. In every one of the four horizontal sets of ramps, each of which begins where the preceding one stops, the number of ramps corresponds to the number of periods in the complementary color pattern. Only two are shown in order to conserve space. There is a known relationship between phase shift and measured depth, and given the phase shift for a particular class and period, the depth or profile data is stored in this memory. The index number (see FIG. 14b) is also transmitted to a look-up table 80, and corresponding x position data is read out. This position is simply the location of the given label relative to a fixed frame of reference such as the label transmitter. A complete identification of the profile or depth data requires values of both x and z.

A more general method of reconstructing the surface can be implemented by defining a more refined label structure based on the shape of the original light signal. In specific, if the shape of the normalized signal is cosinusoidal, then the phase shift may be reconstructed at each pixel in the signal by simply determining the shift of the corresponding point in a reference signal. This process is limited by the noise in the signal normalization process which is introduced by three sources: the implementation hardware, the signal model, and the optics. The normalization scheme shown above can provide an adequate signal for reconstruction on the pixel level. The peak and zero detector scheme is replaced by a suitable scaling and correlation circuit to match the normalized signal with a reference signal acquired from a flat surface (z=0). This correlation requires the matching of amplitudes as a function of index and, thus, is somewhat limited at the peak of the signals since the slope is low. A combination of the peak detector scheme with the correlation scheme provides enhanced response in these regions at the expense of some smoothing.

In conclusion, an improved concept for the non-contact measurement of surface profile has been disclosed. A novel aspect is the specific approach which allows the determination of profile at all points in the field of view. In addition, these measurements are relatively immune to surface reflectivity and roughness. The color illumination pattern may be composed of ultraviolet, visible, or infrared light.

While the invention has been particularly shown and described with reference to preferred embodiments thereof, it will be understood by those skilled in the art that the foregoing and other changes in form and details may be made therein without departing from the spirit and scope of the invention.

The invention claimed is:

1. The method of measuring surface profile comprising the steps of:
   scanning an object with an optical transmitter that projects onto the surface of said object a color illumination pattern comprised of at least two different wavelengths of light which have varying power ratios;
   sensing reflected light at a known parallax angle and separately detecting the different wavelengths which shift position on a detector array depending upon the depth from the object surface to a reference, and generating separate electrical sensor signals corresponding to the different wavelength detected light intensities; and processing said sensor signals to extract depth data from which the surface profile can be determined.

2. The method of claim 1 wherein said color pattern is a complementary pattern composed of only two wavelengths or wavelength bands of light and the total wavelength power is constant at every point.

3. The method of measuring surface profile comprising the steps of:

scanning an object with an optical transmitter that projects onto the surface of said object a color illumination pattern comprised of at least two different wavelengths of light;

wherein said color pattern is projected such that every wavelength power incident on said surface continuously varies;

sensing reflected light at a known parallax angle and separately detecting the different wavelengths which shift position on a detector array depending upon the depth from the object surface to a reference, and generating separate electrical sensor signals corresponding to the different wavelength detected light intensities; and processing said sensor signals to extract depth data from which the surface profile can be determined.

4. The method of measuring surface profile comprising the steps of:

scanning an object with an optical transmitter that projects onto the surface of said object a color illumination pattern comprised of at least two different wavelengths of light;

wherein said color pattern is projected such that the relative amounts of every wavelength power incident on said surface continuously varies whereby the position of each point in the projected color pattern can be identified;

sensing reflected light at a known parallax angle and separately detecting the different wavelengths which shift position on a detector array depending upon the depth from the object surface to a reference, and generating separate electrical sensor signals corresponding to the different wavelength detected light intensities; and processing said sensor signals to extract depth data from which the surface profile can be determined.

5. The method of claim 4 wherein the total wavelength power is approximately constant at every point in the projected pattern.

6. The method of claim 4 wherein each wavelength power varies periodically.

7. The method of measuring surface profile comprising the steps of:

scanning an object with an optical transmitter that projects onto the surface of said object a color illumination pattern comprised of at least two different wavelengths of light;

sensing reflected light at a known parallax angle and separately detecting the different wavelengths which shift position on a detector array depending upon the depth from the object surface to a reference, and generating separate electrical sensor signals corresponding to the different wavelength detected light intensities; and processing said sensor signals to extract depth data from which the surface profile can be determined, including deriving a normalized signal which is substantially independent of surface reflectivity and roughness variations.

8. The method of measuring surface profile comprising the steps of:

scanning an object with an optical transmitter that projects onto the surface of said object a color illumination pattern comprised of at least two different wavelengths of light;

sensing reflected light at a known parallax angle and separately detecting the different wavelengths which shift position on a detector array depending upon the depth from the object surface to a reference, and generating separate electrical sensor signals corresponding to the different wavelength detected light intensities; and processing said sensor signals to extract depth data from which the surface profile can be determined, including deriving a normalized signal which is substantially independent of surface reflectivity and roughness variations, and determining the phase shift between said normalized signal and a reference and obtaining said depth data from the phase shift.

9. The method of claim 8 wherein the phase shift is determined by locating the peaks and zeros of said normalized signal.

10. The method of measuring surface profile comprising the steps of:

projecting onto the surface of an object a color illumination pattern comprised of at least two different wavelengths bands of light that each have a continuous variation of power;

sensing reflected light at a given parallax angle and extracting and separately detecting said wavelength bands which shift position depending upon the depth from the object surface to a reference, and generating separate electrical sensor signals corresponding to the detected light intensity of each wavelength band;

scanning the surface of said object with the projected color pattern while generating said sensor signals; and processing said sensor signals to extract a normalized signal that is substantially independent of surface reflectivity and roughness variations, and processing said normalized signal to yield depth data from which the surface profile can be determined.

11. The method of claim 10 wherein the projected color pattern is a complementary color pattern composed of two wavelength bands of light.

12. The method of claim 11 wherein said color pattern is produced by extracting said wavelength bands by optical filtering of the emitted wavelengths of a multispectral light source, and recombining said wavelength bands by the use of a spatial pattern.

13. The method of measuring surface profile comprising the steps of:

scanning an object with an optical transmitter that projects onto the surface of said object a periodic complementary color pattern composed of two different wavelength bands of light that have a continuous variation of power ratios;

sensing reflected light with an optical receiver at a given parallax angle and extracting and separately detecting said wavelength bands which shift position on a pair of linear detector arrays, one for each wavelength band, depending upon the depth from the object surface to a reference, and generating first and second electrical sensor signals each corresponding to the respective wavelength band detected light intensity; and processing said first and second sensor signals to derive a normalized signal which is substantially independent of surface reflectivity and roughness variations, and processing said normalized signal to yield depth data from which the surface profile can be determined.

14. The method of claim 13 wherein the projected complementary color pattern is produced by extracting said wavelength bands from a single multispectral light source, said wavelength bands further having approximately equal powers, and recombining said wavelength bands by the use of a spatial pattern.

15. The method of claim 13 wherein said first and second sensor signals are processed by calculating $(V_a'/V_a) - (V_b'/V_b)$, where $V_a'$ and $V_b'$ are the first derivatives of sensor signals $V_a$ and $V_b$, to yield said normalized signal.

16. The method of claim 15 wherein said normalized signal is processed by determining the phase shift between said normalized signal and a reference by locating the peaks and zeros of said normalized signal, and obtaining said depth data from the phase shift.

17. A system for acquiring surface profile measurements comprising:

an optical sensor for scanning the surface of an object;

said sensor comprising an optical transmitter having a first optical system for supplying at least two wavelengths of light which are combined to project onto the surface of said object a color pattern in which every wavelength power varies;

said sensor further comprising an optical receiver for sensing reflected light at a predetermined parallax angle and having a second optical system for extracting said wavelengths of light, and that includes a detector array on which said wavelengths shift position depending upon the depth from the surface to a reference, said detector array generating separate electrical sensor signals corresponding to the detected light intensity of each wavelength; and a signal processor for deriving from said sensor signals depth data from which the surfce profile can be mapped.

18. The system of claim 17 wherein said color pattern is projected approximately normal to said surface and said parallax angle is fixed at about 26° to reduce sensitivity to local surface roughness fluctuations.

19. The system of claim 17 wherein said signal processor has color pattern decoupling circuitry for extracting from said sensor signals a normalized signal that is substantially independent of surface reflectivity and roughness variations, and means for processing said normalized signal to yield said depth data.

20. A system for acquiring surface profile measurements comprising:

an optical sensor for scanning the surface of an object;

said sensor comprising an optical transmitter having a multispectral source of light, a first subsystem for extracting two approximately equal power wavelength bands from the emitted wavelengths of said light source, and a second subsystem for recombining said wavelength bands and for projecting onto the surface a periodic complementary color pattern;

said sensor further comprising an optical receiver for sensing reflected light at a predetermined parallax angle and having a third subsystem for separating said wavelength bands and a pair of detector arrays on which said wavelength bands shift position depending upon the depth from the object surface to a reference, said detector arrays generating a pair of electrical sensor signals corresponding to the detected light intensities of the two wavelength bands; and a signal processor comprising color pattern decoupling circuitry for processing said sensor signals and extracting a normalized signal that is substantially independent of surface reflectivity and roughness variations, and means for processing said normalized signal to yield the phase shift between said normalized signal and a reference and hence depth data from which the surface profile can be mapped.

21. The system of claim 20 wherein said first subsystem includes a set of dichroic mirrors and said second subsystem includes a condensing lens for each wavelength band and a patterned mirror which transmits one wavelength band and reflects the other.

22. The system of claim 21 wherein said patterned mirror has a bar pattern of reflective material.

23. The system of claim 22 wherein said light source is an incandescent tungsten lamp and said wavelength bands are in the visible and infrared regions.

24. The system of claim 20 wherein said third subsystem includes a dichroic mirror and pass filters and said detector arrays, one for each wavelength band, are linear photodiode arrays.

25. The system of claim 20 wherein said pattern decoupling circuitry calculates $(V_a'/V_a - V_b'/V_b)$, where $V_a'$ and $V_b'$ are the first derivatives of sensor signals $V_a$ and $V_b$, to yield said normalized signal.

26. The system of claim 25 wherein said means for processing said normalized signal comprises a peak and zero detector circuit to realize the phase shift in each period between said normalized signal and the reference and with which is associated an interpolator.

27. The system of claim 26 wherein said peak detector calculates three functions for a curve with two sides $S_1$ and $S_2$ that meet at $x_o$ that tend to be zero when there is a peak, sums the absolute values of the three functions, and produces an output when a minimum sum is detected.

28. The system of claim 27 wherein said functions are that the derivative of a polynomial approximation at $x_o$ goes to zero, that the polynomial approximation of both sides predicts the same point, and that the slopes are approximately equal in magnitude and opposite in sign.

* * * * *